UNITED STATES PATENT OFFICE.

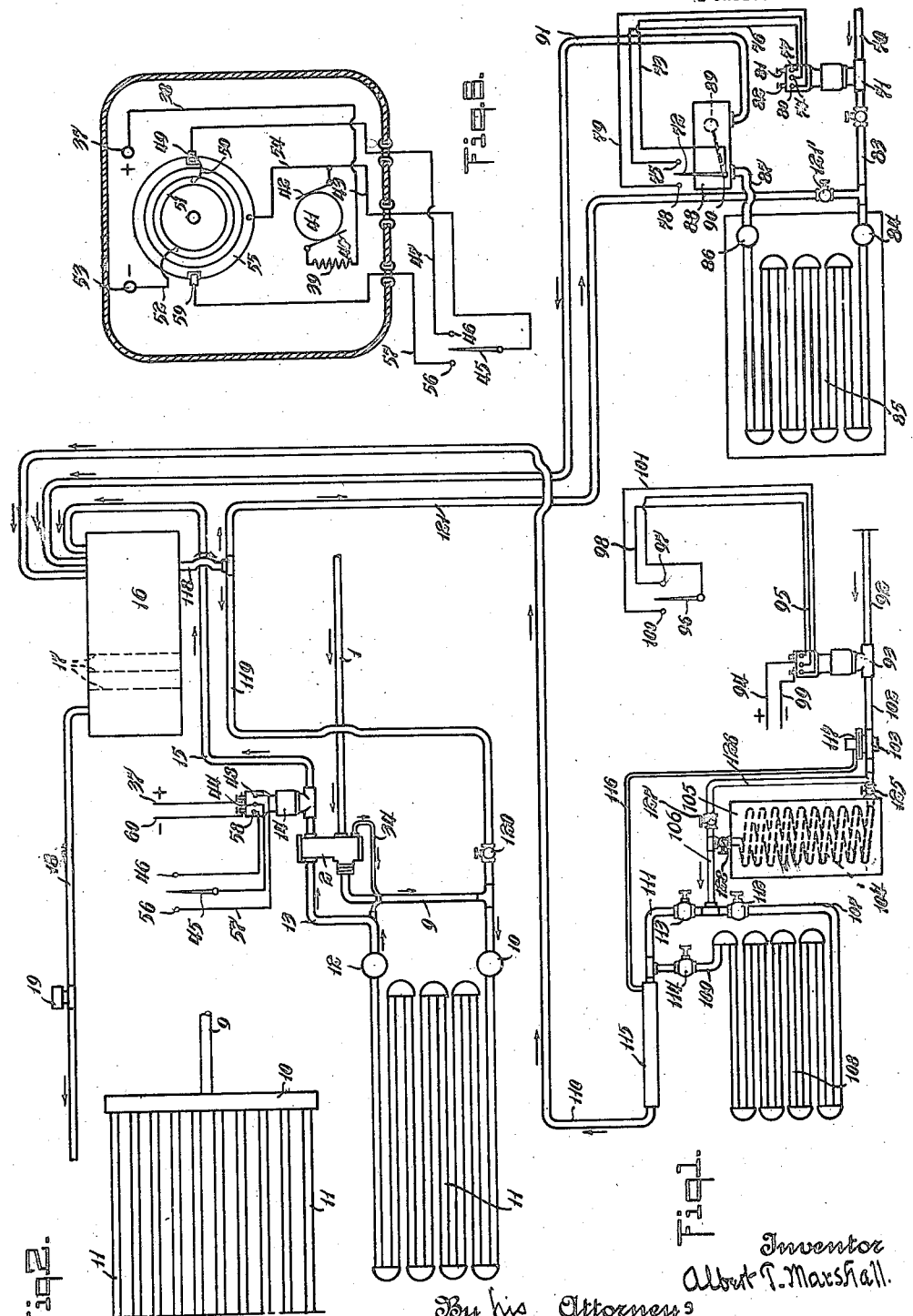

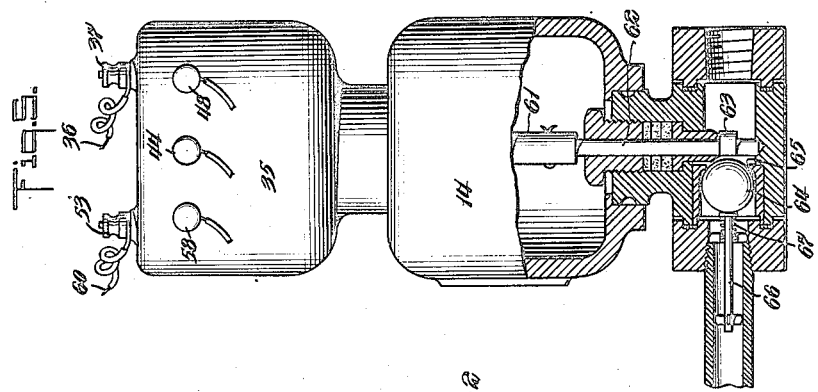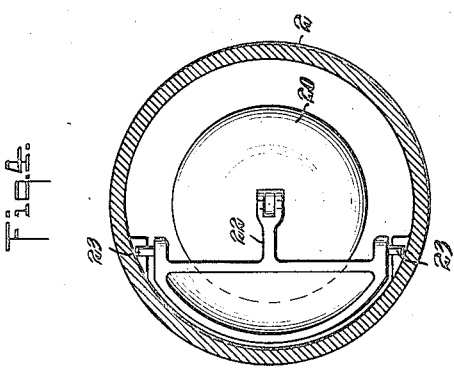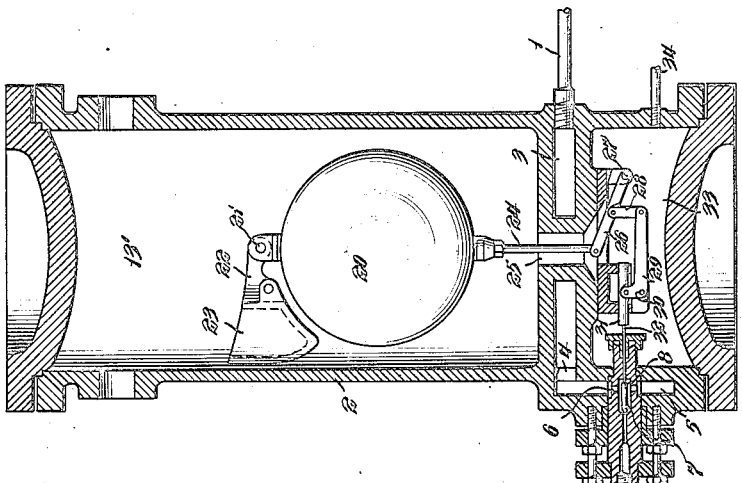

ALBERT T. MARSHALL, OF HARTFORD, CONNECTICUT, ASSIGNOR TO AUTOMATIC REFRIGERATING COMPANY, OF HARTFORD, CONNECTICUT, A CORPORATION OF NEW JERSEY.

REFRIGERATING SYSTEM.

1,425,266.

Specification of Letters Patent.  Patented Aug. 8, 1922.

Application filed May 7, 1920. Serial No. 379,648.

*To all whom it may concern:*

Be it known that I, ALBERT T. MARSHALL, a citizen of the United States, residing at Hartford, county of Hartford, and State of Connecticut, have invented certain new and useful Improvements in Refrigerating Systems, of which the following is a specification.

This invention relates to refrigerating systems and has for its primary object to provide an improved system in which the level of the unvaporized refrigerating fluid is approximately maintained at a constant level with the expansion coils filled with the unvaporized fluid so as to maintian a maximum amount of wetted refrigerating surface and thereby securing conditions of maximum efficiency. Another object of invention is to provide an improved refrigerating system according to which a relatively large volume of refrigerating fluid in passing over a relatively short course at low velocity, may be made to produce a large amount of refrigeration. Another object is to provide improved means for refrigerating the fluid before it reaches the expansion coils and without requiring vapor which is produced by this operation being passed through the expansion coils. Another object is to provide improved means for regulating the level of unvaporized refrigerating fluid in the expansion coils by controlling the admission of such fluid to the coils by means of a float which is raised and lowered according to the rise and fall of the upper level of unvaporized fluid in the expansion coils. A further object is to provide improved means for regulating the process by thermostatic control of the flow in the return pipe leading from the expansion coils. Other and further objects will appear in the specification and be pointed out in the appended claims, reference being had to the drawings which show a preferred embodiment of my invention. In the drawings:

Figure 1 is a diagrammatic view of a refrigerating system embodying the principles of the present invention;

Figure 2 is a plan view at one end of the parallel pipes which make up the bottom tier of one of the refrigerating units;

Figure 3 is a vertical section on an enlarged scale of the float chamber and expansion valve to be hereinafter referred to, parts being shown in side elevation;

Figure 4 is a transverse section of the same, parts being shown in plan;

Figure 5 is a side elevation and vertical section of one of the thermostatically or float controlled motor operated valves;

Figure 6 is a transverse section of the same showing a diagram of the wiring circuits.

In some respects, the present application constitutes an improvement on my copending application Serial No. 334286 filed October 29th, 1919. Thus, in the present application, the unvaporized refrigerating fluid is conveyed from a receiver (not shown) by means of a pipe 1, as shown in Figure 1, this pipe being therefore a high pressure channel. Said pipe passes through the lower portion of a float chamber housing 2. As shown in Figure 3, the pipe 1 enters an annular high pressure chamber 3 which communicates through a port 4 with admission chamber 5 of an expansion valve. The admission chamber 5 opens inwardly through radial port 6 into a valve chamber 7 within which operates a needle valve 8 in the manner to be hereinafter pointed out. Leading from the expansion valve is a low pressure pipe 9 which delivers unvaporized fluid into an inlet header 10 which is common to a plurality of parallelly arranged coils 11 (see Figure 2). The upper ends of the parallel coils 11 are connected to an outlet header 12 from which leads pipe 13 which enters the upper end of the float chamber 2. Connected to the upper end of float chamber 2 is a motor valve housing 14 from which leads a pipe 15 which discharges into a trap 16, said trap containing a plurality of screens adapted to intercept any unvaporized fluid which may be discharged into the trap 16. Leading from the trap 16 is a return pipe 18 which leads back to the compressor such as that shown in my above identified copending application. Both of these applications have in common a back pressure valve for controlling the operation of the compressor, said valve being shown at 19 in the present application. Referring again to Figure 3, the pipe 13 discharges directly into the float chamber 13', a float 20 being suspended by a pin 21 from a rocker arm 22 of a counter-poise device provided with a receptacle 23 for holding any desired weight of counter-poise to adapt the float 20 to be raised and lowered to correspond with the amount of unvaporized refrigerating fluid contained within the float chamber 13'.

Depending from the float 20 is a rod 24 which extends through a passage 25 and is pivotally connected at its lower end to a lever arm 26 which is fulcrumed at 27. Lever arm 26 is connected by a link 28 to one arm of a right angle lever 29 which is pivoted at 30. The shorter arm of said bent lever is connected to a slide 31, said slide being connected by a rod 32 to the needle valve 8. The lower end of the float chamber connects by the passage 25 with the chamber 33 which is connected by means of a pipe 34 to the pipe 13. It will be seen, therefore, that the unvaporized fluid in chamber 13' will assume the same level as it does in pipe 13. In order to maintain the refrigerating coils 11 completely filled, the operating connections between float 20 and the needle valve 8 are constructed and arranged to close said needle valve only when the unvaporized fluid attains a predetermined height within the float chamber 13'. As shown in Figures 5 and 6, the housing 14 is provided with an extension 35, an electric wire 36 being connected to a binding post 37, a wire 38 within the extension 35 being connected to the field winding 39 of a motor comprising brush 40, armature 41 and brush 42. Brush 42 is connected by a wire 43 to a binding post 44 from which a wire leads to a thermostat needle 45 in the room to be cooled. Adjacent to the thermostat needle 45 is a contact 46 which is connected by a wire 47 to the binding post 48, which is connected within the housing 35 to a fixed contact 49. Whenever the armature 41 rotates, a conducting link 50 is caused to revolve from its position shown in Figure 6 or from a position diametrically opposite thereto, depending on its location with reference to the stationary contact rings 51 and 55. The inner end of the link 50 has sliding contact with the inner ring 51 which is connected by a wire 52 to the binding post 53 to which is connected the negative line 60. A circuit is thus established which sets the armature 41 in motion. Immediately the link 50 is moved from fixed contact 49 over on to the fixed ring 55. A running circuit is thereby established from plus main 36, binding post 37, wire 38, field winding 39, brush 40, armature 41, brush 42, a wire 54 which is connected to the outer fixed ring 55, link 50, inner ring 51, wire 52, binding post 53, and negative line 60. This running circuit is sustained until the link 50 comes into contact with the fixed contact 59 which is electrically connected to the thermostat contact 56 by means of a wire 57 leading to binding post 58 which is connected by wire to the contact 59. This breaks the circuit as the needle 45 is on the contact 46. It is to be noted that the link 50 moves at the same angular velocity as the spinle 61 (see Figure 5) which carries a shaft 62 provided at it lower end with an eccentric 63. Said eccentric is adapted to displace a ball valve 64 from its seat 65, a plunger 66 being yieldably pressed by a spring 67 against the ball valve 64, thus tending to hold said valve to its seat. The ball valve 64 within the housing 14 is thus opened or closed depending upon the position of thermostat needle 45. According to the present embodiment of my invention, a second supply pipe 70 connected up with an expansion valve housing 71, the ball valve therein being controlled by a switch blade 72 which is connected by a wire 73 to a binding post 74 on the housing of a motor similar to that illustrated in diagram in Figure 6. Cooperating with switch 72 is a contact 75 connected by a wire 76 with a binding post 77 and another contact 78 connected by a wire 79 with a binding post 80. Line wires may be connected to other binding posts 81 and 82 so that whenever the blade 72 covers one or the other of the contacts 75 and 78, the motor within the housing is energized to open or close the expansion valve within the valve housing 71. A pipe 83 leads from the valve housing 71 to an inlet header 84 which is common to a plurality of parallelly arranged expansion coils 85 which are connected at their upper ends to a common outlet header 86. The outlet header 86 is connected by a pipe 87 to a closed or pressure tank 88 within which is a float 89 mounted on the rod 90 which carries switch blades 72 on the outside of said tank. It will be seen therefore that the blade 72 is made to cover contacts 75 or 78 according to whether the float 89 falls or rises in the tank 88. Leading from the tank 88 is a pipe 91 which discharges into the trap 16. According to the embodiment of my invention shown on the drawings, a third supply pipe 92 leads to a valve housing 93 within which a valve is operated by an electric motor through circuit wires 94, 95, thermostat needle 96, contact 97, wire 98 and line wire 99 or by a circuit which includes the other thermostat contact 100 and wire 101 in circuit with the wires 94 and 99. A pipe 102 provided with a thermostatically operated valve 103, is connected up to one end of a refrigerating coil 104 within a tank 105. The upper end of said coil 104 is connected by a pipe 106 to a pipe 107 which leads to the inlet end of a refrigerating coil 108. The upper end of said coil 108 is connected by a pipe 109 to the return pipe 110 which discharges into the trap 16. A by-pass pipe 111 is arranged to connect the pipe 106 to the return pipe 110. In order to make it possible to cut in and out the coil 108, valves 112, 113 and 114 are provided in the several branches for controlling the direction of flow of the refrigerating fluid through the several pipes and coils. Surrounding the return pipe 110 is a thermostatic chamber 115 which is connected by a pipe 116 with a diaphragm chamber 117 within which a diaphragm operates to control the valve within the housing 103. Leading from the trap 16 for draining off the unvaporized fluid therein, is a pipe 118 which connects with a pipe 119 which leads to the low pressure supply line 9 emptying into the inlet header 10. A hand valve 120 may be employed to admit the fluid from pipe 119 as desired. Another pipe 121 leads from the pipe 118 to the supply pipe 83 leading into the header 84. A hand valve 121' is also provided in this pipe to control the admission of the fluid from the trap 16. The operation of my improved system will now be readily understood and briefly described is as follows.

As pointed out in the foregoing specification, the float 20 (see Figure 3) controls the needle valve in such a way as to keep the parallelly arranged coils 11 completely filled with unvaporized fluid. The wetted surfaces of said coils are therefore maintained at a maximum and the refrigerating efficiency correspondingly raised. It will be understood that the refrigerant is maintained at an approximately constant level by the float 20. In view of the fact that the several expansion coils of the refrigerating unit are arranged in parallel, the runs of the fluid therethrough is made very short and in consequence of the large cross sectional area of the fluid flowing from the inlet header 10 to the outlet header 12, a resulting low velocity and small friction of the refrigerating medium in the expansion piping is produced. When the desired temperature is reached in the air surrounding the expansion coils, the thermostatic needle 45 is moved to the contact 46, the motor 41 is started and the eccentric 63 is rotated from a position in which the ball valve 64 is held unseated into the position shown in Figure 5. Thereupon the pressure in the coils soon rises to that corresponding to the temperature of the air surrounding said coils and the flow of heat into the coils is arrested. In this connection, it may be noted that in order to facilitate the return movement of the gasified refrigerant, the opening in the motor operated valve 64, 65 should be comparatively large and need not close tightly when the eccentric cam 63 releases it. On the other hand, the valves 71 and 93 should be comparatively small and close tightly for properly controlling the refrigerant in its fluid condition. From an inspection of Figure 3, it will be seen that the high pressure unvaporized fluid as it flows through the annular chamber 5, is approximately surrounded on all sides by the low temperature fluid from the outlet header 12. As a result, any fluid which may become vaporized in reducing the temperature of the high pressure refrigerant, passes upwardly through the float chamber and hence is prevented from passing through the expansion coils. As it ordinarily requires the vaporization of about 20% of the refrigerating fluid for cooling the other 80%, it will be seen that a considerable burden is removed from the refrigerating coils and the efficiency raised to a corresponding degree. The admission of fluid through the pipe 70 and valve housing 71 is controlled electrically by switch 72 in such a way that a sufficient supply is introduced to the coils 85 to keep them completely filled for securing the maximum refrigerating efficiency. The fluid entering through the pipe 92 on the other hand, is controlled electrically according to the temperature of the surrounding air as well as by the thermostatic control due to the temperature of the fluid in the return pipe 110. Should it be desired to operate the tank coil 104 independently of the expansion coil 108, valve 113 in by-pass 111 is opened while the valves 112 and 114 are closed. Should it be desired to work the coils 104 and 108 simultaneously valve 113 is closed and valves 112 and 114 are opened. Should it be desired to cut out refrigerating coil 104 while continuing the coil 108 in operation, a hand valve 125 adjacent the inlet end of coil 104, may be closed and the refrigerating fluid permitted to flow through a by-pass pipe 126 when the hand valve 127 therein has been opened. For this purpose, hand valves 112 and 114 will be opened and by pass valve 113 will be closed.

It is of course to be understood that the term "expansion coil" as employed in the specification and claims, is intended to cover any form of expansion or refrigerating chamber or vessel which may be connected up in a refrigerating system such as that exemplified in the attached drawings.

I claim:

1. An automatic refrigerating system comprising a feed line for high pressure liquid refrigerant, an expansion valve in said feed line, a refrigerating coil connected to the low pressure side of said expansion valve, a float chamber located above said refrigerating coil, and connected to the outlet end of said refrigerating coil, a float in said float chamber in operative relation to the expansion valve for automatically maintaining the level of liquid refrigerant in the float chamber substantially constant, a suction line leading from the upper portion of the float chamber, and a thermostatically controlled valve in said suction line for regulating the flow of refrigerant in accordance with changes of temperature adjacent to said refrigerating coil.

2. An automatic refrigerating system comprising a feed line for high pressure liquid refrigerant, an expansion valve in said feed line, a refrigerating coil connected at its lowest point to the low pressure side of said expansion valve, a float chamber located above said refrigerating coil and connected at both its upper and lower ends to the outlet end of said refrigerating coil, a float in said float chamber mechanically connected with the expansion valve for automatically maintaining the level of liquid refrigerant substantially constant in the float chamber, a suction line leading from the upper portion of the float chamber, and a thermostatically controlled valve in said suction line for regulating the flow of refrigerant in accordance with changes of temperature adjacent to said refrigerating coil.

3. An automatic refrigerating system comprising a feed line for high pressure liquid refrigerant, an expansion valve in said feed line, a refrigerating coil connected at its lowest point to the low pressure side of said expansion valve, a float chamber located above said refrigerating coil and connected at both its upper and lower ends to the outlet end of said refrigerating coil, a float in said float chamber mechanically connected with the expansion valve for automatically maintaining the level of the liquid refrigerant substantially constant in the float chamber, a suction line leading from the upper portion of the float chamber, a thermostatically controlled valve in said suction line for regulating the flow of refrigerant in accordance with changes of temperature adjacent to said refrigerating coil, a trap in said suction line beyond and above said thermostatically controlled valve for separating liquid from gaseous refrigerant, a connection from the bottom of said trap to the inlet end of the refrigerating coil, and a hand operated valve in said connection for admitting refrigerant at will.

ALBERT T. MARSHALL.